United States Patent
Judek et al.

(10) Patent No.: US 7,201,959 B2
(45) Date of Patent: *Apr. 10, 2007

(54) ABSORBENT POLYMERIC COMPOSITION

(75) Inventors: Eric Judek, Francieres (FR); Francois Dessus, Orsay (FR)

(73) Assignee: Sud-Chemie Inc., Louisville, KY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 416 days.

(21) Appl. No.: 10/328,579

(22) Filed: Dec. 24, 2002

(65) Prior Publication Data

US 2005/0089687 A1    Apr. 28, 2005

Related U.S. Application Data

(60) Provisional application No. 60/375,841, filed on Apr. 25, 2002.

(51) Int. Cl.
*B32B 5/16* (2006.01)
*B32B 27/06* (2006.01)
*B32B 27/00* (2006.01)

(52) U.S. Cl. .................. 428/323; 428/474.4; 428/480; 428/500

(58) Field of Classification Search ................ 252/175, 252/176; 428/67, 71, 72, 323, 324, 330, 428/331, 304.4, 474.4, 480, 500
See application file for complete search history.

(56) References Cited

U.S. PATENT DOCUMENTS

| 3,245,946 A | | 4/1966 | O'Connor | |
|---|---|---|---|---|
| 3,833,406 A | * | 9/1974 | White | 215/12.2 |
| 4,013,566 A | | 3/1977 | Taylor | |
| 4,061,807 A | | 12/1977 | Shaler | |
| 4,665,050 A | | 5/1987 | Degen | |
| 4,894,417 A | | 1/1990 | Holden | |
| 5,078,909 A | | 1/1992 | Shigeta | |
| 5,432,214 A | * | 7/1995 | Lancesseur | 524/12 |
| 5,911,937 A | * | 6/1999 | Hekal | 264/255 |
| 6,124,006 A | | 9/2000 | Hekal | |
| 6,130,263 A | | 10/2000 | Hekal | |
| 6,174,952 B1 | | 1/2001 | Hekal | |
| 6,187,269 B1 | | 2/2001 | Lancesseur | |
| 6,194,079 B1 | | 2/2001 | Hekal | |
| 6,214,255 B1 | | 4/2001 | Hekal | |
| 6,684,605 B2 | * | 2/2004 | Weder | 53/412 |
| 2002/0073530 A1 | | 6/2002 | Ferri | |

FOREIGN PATENT DOCUMENTS

DE    4013799    10/1991

* cited by examiner

*Primary Examiner*—Sheeba Ahmed
(74) *Attorney, Agent, or Firm*—Scott R. Cox; Joan L. Simunic

(57) ABSTRACT

A moisture-absorbing polymeric material is disclosed which comprises a combination of a thermoplastic material with an absorbent. The thermoplastic material is chosen such that when the absorbent is added to the thermoplastic material in the molten state, the absorbent will tend to migrate towards the surface of the moisture-absorbing polymeric material. This results in a concentration gradient for the absorbent wherein the desiccant is more highly concentrated in an outer layer of the polymer material than towards the center. In this way, more absorbent is pushed towards the surface where it can more easily absorb moisture from the surrounding atmosphere.

10 Claims, 4 Drawing Sheets

ABSORBENT POLYMERIC COMPOSITION

CROSS-REFERENCE TO RELATED APPLICATIONS

The present application is related to U.S. Provisional Application Ser. No. 60/375,841 filed on Apr. 25, 2002 and incorporated herein in its entirety by reference.

BACKGROUND

The present development relates to an absorbent-entrained polymeric structure, having at least one surface and an inner region, wherein the absorbent concentration is greater near the surface than it is in the inner region. Specifically, the migration of the absorbent toward the surface results in the formation of a "layered" structure. The absorbent-entrained polymeric structure may be produced and formed into selected articles by injection molding, blow molding, extrusion or other means of conventional polymer processing.

Many products are most effective and/or aesthetically pleasing when the product is packaged such that the product environment maintains a narrow moisture content range. Although the package environment may be optimal when the product is first packed, maintaining that environment during the lifetime of the product can create many challenges.

For example, many diagnostic test strips and electronic parts are manufactured and packaged so as to minimize the moisture exposure before consumer use. Because the product may be affected by the presence of moisture, the manufacturer must strive to provide a package that will remove any moisture from within the package when the product is first packed, and that will keep moisture out during shipment and display. As is known in the art, additional moisture can be kept out of the package through the use of moisture-impermeable materials. However, moisture-impermeable materials will not affect any ambient moisture that is initially packed with the product—and may actually create more problems by preventing the moisture from exiting from the package. Further, if the package holds product for more than a single use, the consumer's repeated opening and closing of the package will allow moisture to enter the package and will, over time, lead to deterioration of the product.

A different problem is presented when the product itself releases moisture after being packaged. For example, fresh produce can release moisture after being packaged. If the produce is packaged in a non-protective package that allows for moisture permeation, there is a risk that by the time the product reaches the consumer it will have lost too much moisture and will appear "dried out." However, if the produce is packaged in a moisture-impermeable package that traps the moisture in the package, there is a risk that the moisture will cause the produce to wilt or will allow for bacterial growth within the package. In both situations, the product loses its consumer acceptability.

In order to absorb excess moisture and protect the contained products, absorbing and/or desiccating materials have been introduced into the interior of containers. These absorbents are usually in the form of powders or granules and therefore must be contained in some manner to prevent contamination of the product. The prior art discloses desiccant packed in bags and packets formed from breathable materials, desiccant packed in aerated plastic cartridges, perforated plastic canisters and desiccant tablets. There are problems, however, with using these desiccant-filled containers, such as the risk that the containers could break and release the desiccant freely into the container. There is also the potential for the presence of dust originating from the desiccant and adversely affecting the product to be protected from the moisture. Thus, there is a need for a means of introducing desiccating material into a plastic container or other article of manufacture while somehow preventing the desiccant from releasing and potentially contacting the moisture-sensitive product.

The prior art teaches that desiccant can be entrained into a plastic structure, thereby preventing the desiccant from being released. However, for the desiccant to function as intended, the moisture must be able to make contact with the desiccant. When the desiccant is entrained within the plastic, contact with the moisture is limited. U.S. Pat. No. 5,432,214 (issued Jul. 11, 1995 to Lancesseur) teaches that a fiber can be added to the desiccant-entrained thermoplastic to provide a means for wicking the moisture into the interior of the polymer and to the desiccant. However, the selection of fibers for a '214 polymer is limited because few fibers have been approved by the Food and Drug Administration for use in pharmaceutical packaging and because the fibers must be able to withstand the extrusion process. Alternatively, U.S. Pat. No. 5,911,937 (issued on Jun. 15, 1999 to Hekal) teaches the use of channels that are created with a channeling agent. The channeling agent "form[s] passages in the mixture through which moisture is communicable to desiccating agent that is entrained within the mixture." However, preparing the '937 polymer can be challenging. As noted in the '937 patent "because of the relatively fine size of the desiccant particles, it is advantageous to have many small channels or passages throughout the polymer base, as opposed to a few large channels that will expose less surface area within the polymer solid." To accomplish this, polymer additives may be needed.

The desiccant is most accessible, and there is a greater probability that the moisture can make contact with the desiccant, if it is entrained near the surface of the plastic. In U.S. Pat. No. 4,665,050 (issued May 12, 1987 to Degen et al.), heated absorbent particles are secured onto a thermoplastic material such as polyethylene or polypropylene, preferably such that each sorbent particle is not completely enveloped in the polymeric binding material but rather that each particle merely be held in place by the polymeric binding material. While the resulting polymer has good adsorbent accessibility, the process to form the polymer is tedious.

It is accordingly a primary object of the invention to provide an absorbent-entrained polymeric composition that will provide for an effective amount of moisture-to-absorbent contact without the use of fibers or hydrophilic compounds that might contaminate a moisture sensitive product coming in contact with the polymeric composition. It is a further object of the invention that the absorbent-entrained polymeric composition be relatively easy to prepare or manufacture.

SUMMARY OF THE INVENTION

The present development relates to an absorbent-entrained polymeric structure, having at least one surface and an inner region, wherein the absorbent concentration is greater near the surface than it is in the inner region. In the present invention, the migration of the absorbent toward the surface results in the formation of a layered structure. This is achieved by blending an absorbent with a thermoplastic material predominantly formed from thermoplastic polymers such as polyethylene, polypropylene, or polystyrene, such that the absorbent concentrates toward the surface of the polymeric composition. Specifically, absorbent is added to a thermoplastic material while it is in the melted state and the blended absorbent and thermoplastic material are then formed by prior art polymer processing techniques. In a preferred embodiment the absorbent-entrained polymeric structure is formed into selected articles by injection molding.

DETAILED DESCRIPTION OF THE PREFERRED EMBODIMENT

The absorbent-entrained polymeric structure of the present invention is intended for use in formed articles of manufacture. For example, the absorbent-entrained polymeric structure may be used to form vials or trays for containing products requiring an essentially moisture-free environment, such as medical diagnostic strips or electronic components. As used herein, absorbent refers to a compound capable of interacting with and retaining a chemical compound having an affinity for the absorbent. Although technically different in the mechanism of reaction, for the purposes of this invention, the terms "absorbent" and "adsorbent" are intended to be used interchangeably. The term "desiccant" describes a specific type of absorbent or adsorbent.

Figure 1:
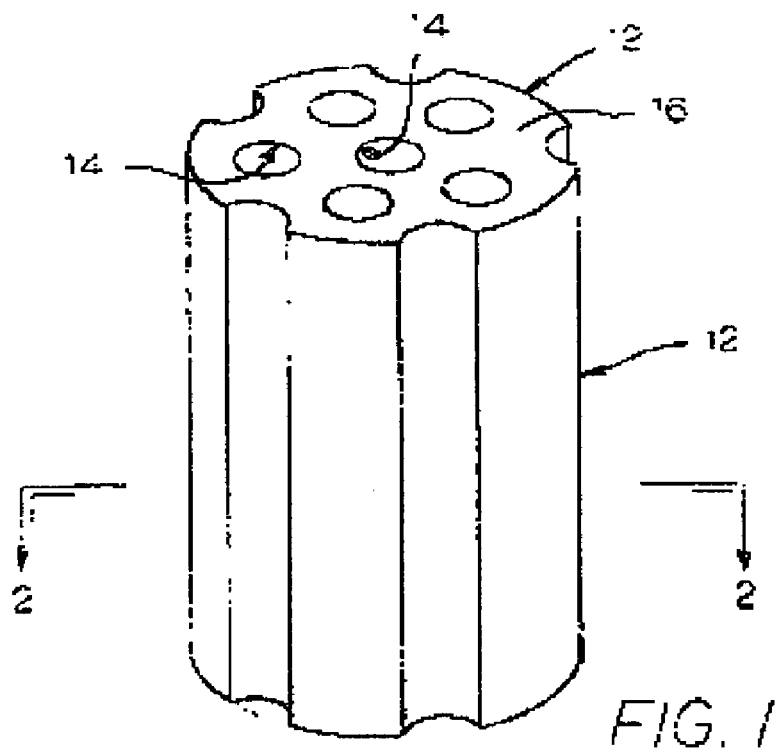
FIG. 1 is a representative absorbent cartridge prepared from a desiccant-entrained polymeric structure made according to the present invention.
Figure 2:
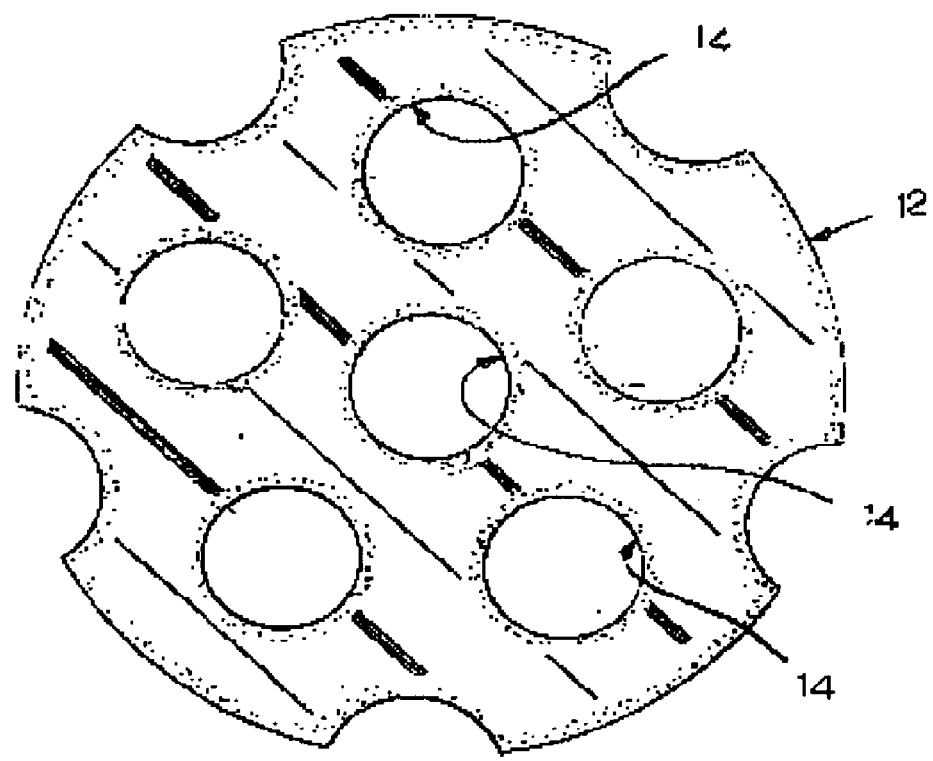
FIG. 2 is a cross-sectional view of the cartridge of FIG. 1 taken along line 2—2.

FIGS. 1 and 2 show a representative adsorbent cartridge (10) prepared from an absorbent-entrained polymeric structure made according to the present invention. The polymeric structure comprises at least one thermoplastic material (20) and at least one absorbent (22), and can be formed into a variety of shapes, as is known in the art. For example, the polymeric structure may be formed in a cylindrical shape or in a cubical shape or in strips or in canisters or any shape desired by the user to form individual units that can be placed inside a package or container. Alternatively, the polymeric structure can be shaped to conform to the internal shape of a container such that the polymeric structure essentially forms a liner for the container.

As shown in FIG. 1, the cartridge defines a plurality of surfaces (12, 14) and an interior region (16). The cross-sectional view of the adsorbent cartridge, FIG. 2, illustrates the relative distribution of the absorbent in the molded article (10). As shown, the absorbent (22) concentrates near the surfaces (12, 14) of the polymeric structure leaving the interior region (16) to be comprised of predominantly thermoplastic material (20), and thereby resulting in the formation of a layered structure.

The thermoplastic material (20) can be any material that exhibits thermoplastic properties, such as a copolymer of two or more monomers, a mixture of two or more polymers from single monomers, a mixture of two or more copolymers and a mixture of at least one polymer from a single monomer and at least one copolymer. Non-limiting examples of polymers from single monomers include: polystyrenes, polyolefins, polyethylene, polypropylene, polyacrylates, polymethacrylates, polyamides, polyesters, and polyvinyl chloride. Non-limiting examples of copolymers include: styrene-butadiene rubbers (SBR), styrene-ethylene-butadiene-styrene copolymers (SEBS), butyl rubbers, ethylene-propylene rubbers (EPR), ethylene-propylene-diene monomer rubbers (EPDM), ethylene-vinyl acetate copolymers (EVA), ethylene-acrylate or butadiene-acrylonitrile, maleic anhydride modified polymers and copolymers, and grafted copolymers. When a copolymer or a mixture is used, a preferred combination comprises monomers or polymers that have a common chemical monomeric unit. For example, the thermoplastic material may be prepared from linear low density polyethylene (LLDPE) and low density polyethylene (LDPE) and ethylene vinyl acetate (EVA) copolymer, wherein each of the components includes an ethylene monomeric unit.

The absorbent (22) can be any material capable of absorbing moisture, or otherwise removing moisture from a surrounding atmosphere, or any material capable of absorbing or otherwise removing other chemical compounds, such as but not limited to oxygen, carbon dioxide, carbon monoxide and amine complexes, from the atmosphere. Herein, the term absorbent may be used interchangeably with the term dehydrating agent, desiccant or adsorbent. Non-limiting examples of absorbents would include silica gel, desiccant clay, molecular sieves, zeolites or combinations thereof.

The relative concentration of thermoplastic material to absorbent may vary depending on the thermoplastic material and the absorbent used. In an embodiment, the polymeric structure comprises from about 20 wt % to about 85 wt % thermoplastic material and from about 15 wt % to about 80 wt % absorbent.

The polymeric structure is produced by forming and setting the thermoplastic material after it has been dosed with absorbent. The polymeric structure may be produced by common plastic manufacturing processes such as extrusion, co-extrusion, injection molding, blow molding, and any other methods that involve melting the thermoplastic material to an essentially liquid state. For example, the polymeric structure may be produced by the steps of heating the selected thermoplastic material (or combination of materials) until the thermoplastic is viscous, adding the selected absorbent, blending the absorbent into the melted thermoplastic, extruding the thermoplastic-absorbent blend, and cooling the thermoplastic—absorbent blend. The polymeric structure can be cut or ground or processed by other means known in the art.

The present invention can be illustrated and explained through a series of examples presented herein, which are not to be taken as limiting the present invention in any regard.

EXAMPLE 1

A polymeric structure is prepared from about 50 wt % of a thermoplastic material and about 50 wt % of a desiccant. The thermoplastic material comprises about 22 wt % linear low density polyethylene (LLDPE) and about 62 wt % low density polyethylene (LDPE) and about 16 wt % ethylene vinyl acetate (EVA) copolymer. The desiccant comprises molecular sieves. The thermoplastic material is liquefied and the desiccant is blended into the liquefied thermoplastic material. The thermoplastic-desiccant blend is extruded at about 200° C. and about 110 bar pressure into thin strips having thicknesses of from about 395 μm to about 1140 μm. The strips are sliced into 30 μm cuts.

EXAMPLE 2

A polymeric structure is prepared as in Example 1 except that the thermoplastic-desiccant blend is injection molded into strips having thicknesses of from about 1170 μm to about 1995 μm rather that being extruded.

EXAMPLE 3

A polymeric structure is prepared from about 65 wt % of a thermoplastic material and about 35 wt % of a desiccant. The thermoplastic material comprises about 92.3 wt % polystyrene and about 7.7 wt % styrene-ethylene-butadiene-styrene copolymer (SEBS). The desiccant comprises silica gel. The thermoplastic material is liquefied and the desiccant is blended into the liquefied thermoplastic material. The thermoplastic-desiccant blend is injection molded into cartridges.

EXAMPLE 4

A polymeric structure is prepared from about 30 wt % of a thermoplastic material and about 70 wt % of a desiccant. The thermoplastic material comprises about 76.7 wt % ethylene-methylacrylate copolymer and about 23.2 wt % ethylene-acrylic ester-maleic copolymer. The desiccant comprises molecular sieves. The thermoplastic material is liquefied and the desiccant is blended into the liquefied thermoplastic material. The thermoplastic-desiccant blend is extruded into thin strips having thicknesses of about 1.3 mm.

EXAMPLE 5

A useful container for medicine or diagnostic strips is prepared by forming an exterior shell out of a substantially water impermeable thermoplastic material such as polyethylene or polypropylene. A full or partial liner may then be formed out of the absorbent polymeric material and added to the interior of the container. The liner may either be formed inside the container in a dual injection mold, or formed separately from the container and later inserted.

Figure 3:
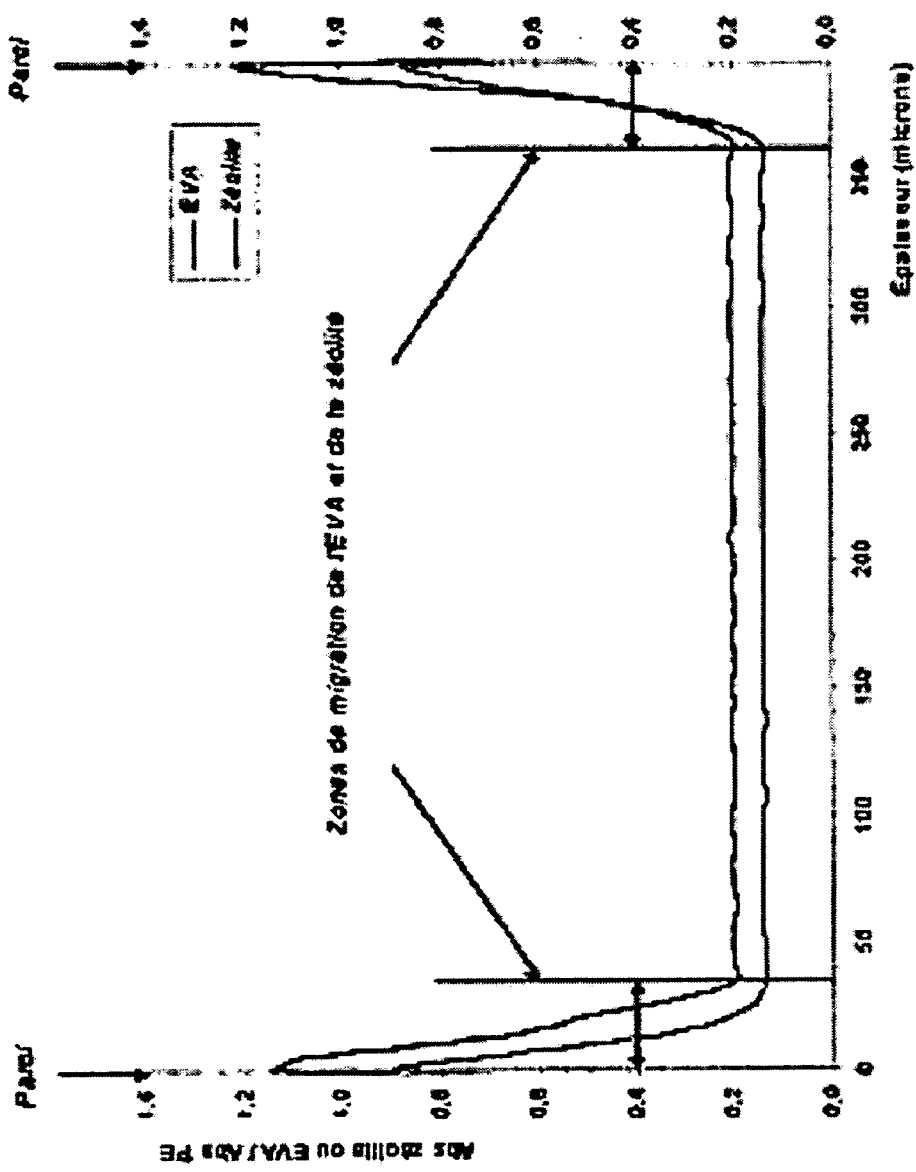
FIG. 3 is an infra-red microanalysis of a strip made in accordance with Example 1.
Figure 3A:
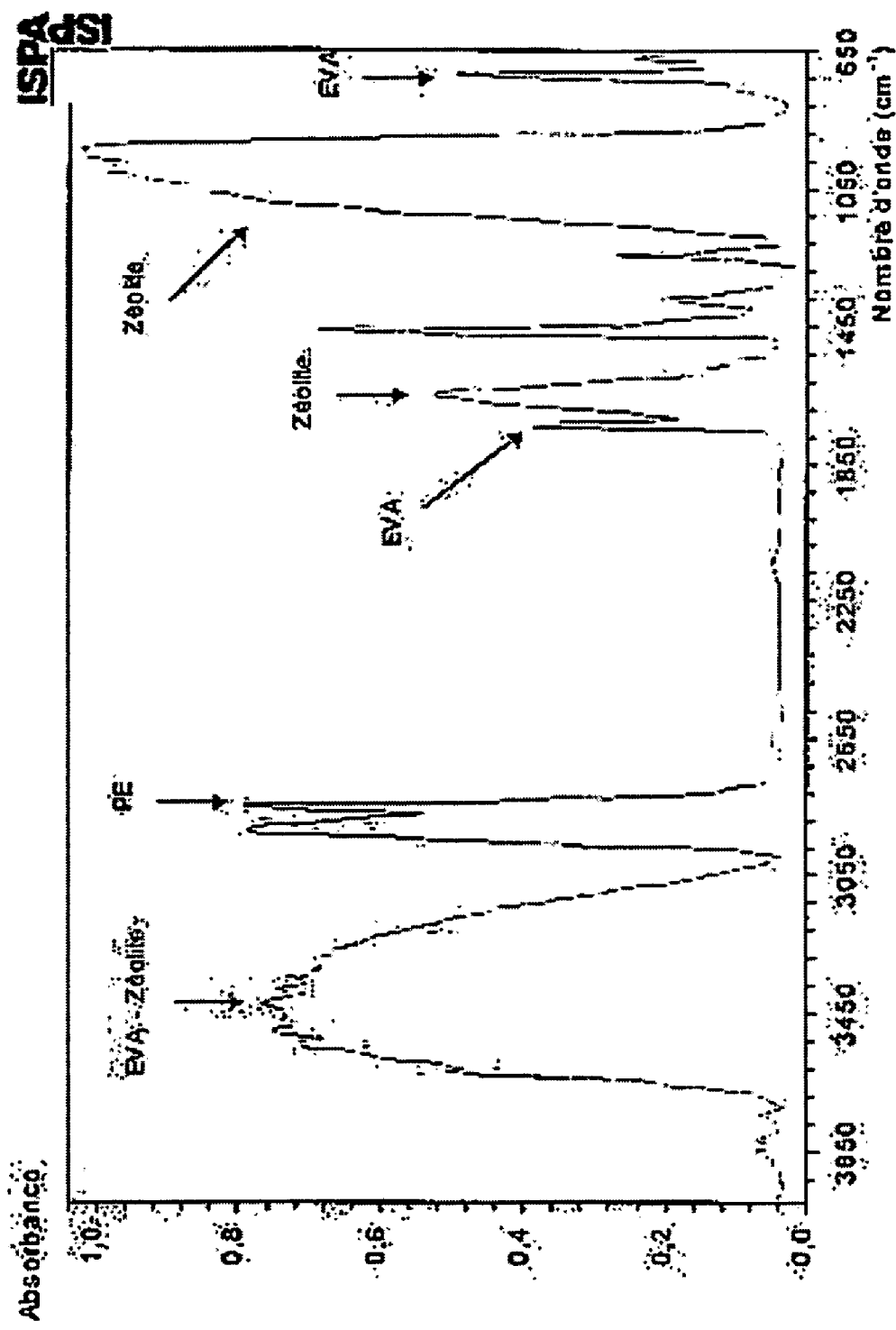
FIG. 3A is an infra-red microanalysis taken at the surface of the strip from FIG. 3.
Figure 3B:
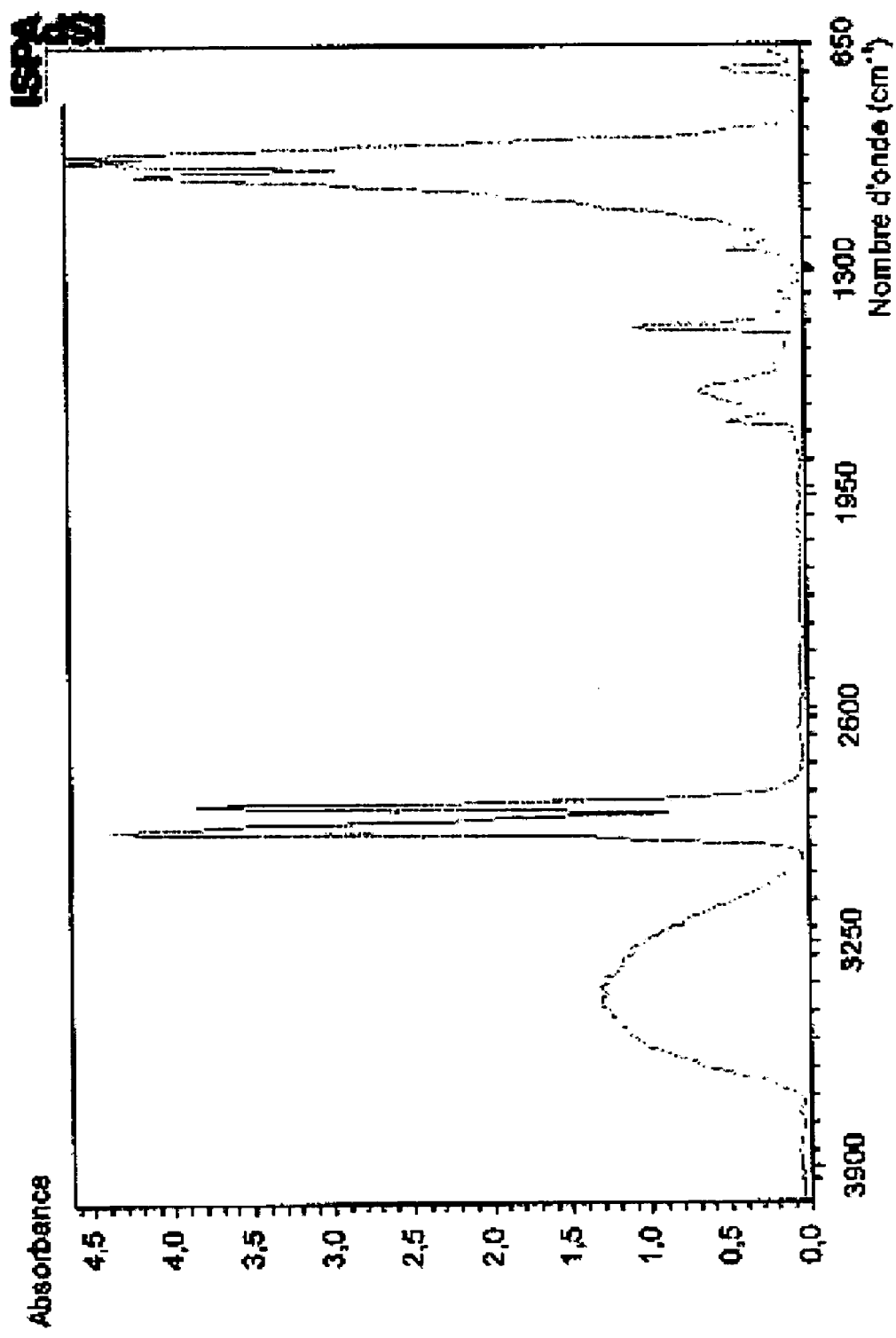
FIG. 3B is an infra-red microanalysis taken at the center of the strip from FIG. 3.

The polymeric structure when prepared according to the present invention can be identified by the distinctive migration of desiccant toward the surface of the polymeric structure. For example, FIGS. 3, 3A and 3B show, respectively, an infra-red microanalysis of a strip made in accordance with Example 1 and having an overall thickness of about 850 μm, an infra-red microanalysis taken at the surface of the strip, and an infra-red microanalysis taken at the center of the strip. There is a significantly higher concentration of desiccant near the surface of the strip (FIG. 3A) than near the center (FIG. 3B).

The high moisture absorbing polymeric material may further comprise additives such as plasticizers, stabilizers, dyes, pigments, foaming agents or combinations thereof, as well as any other additives which are known in the art of plastics. The high moisture absorbing polymeric material may be used in any application in which absorption of moisture is desirable. Further, the polymeric material may be used in odor-absorbing applications.

The polymeric structure of the present invention is intended for use as a packaging component for moisture-sensitive products. The polymeric structure differs from the desiccant-entrained polymers of the prior art by requiring that the desiccant or absorbent migrate so as to be present at a higher concentration near the surface of the polymeric structure than at the center or interior of the structure. It is understood that the composition of the polymeric structure and the specific processing conditions may be varied without exceeding the scope of this development.

What is claimed is:

1. An absorbent-entrained polymeric structure defining an outer layer and an interior region, said structure comprising a thermoplastic material and at least one absorbent, wherein said absorbent is entirely entrained within said thermoplastic material, wherein said structure has a greater concentration of absorbent in the outer layer of the polymeric structure than in the interior region, and wherein said thermoplastic material is selected from the group consisting of a copolymer containing at least two of the same monomers, a mixture of at least two polymers from single monomers, each polymer of which contains the same monomer, a mixture of at least two copolymers, each copolymer having a common monomer, a mixture of at least one polymer from a single monomer and at least one copolymer, wherein the polymer and the copolymer have a common monomer, and combinations thereof.

2. The absorbent-entrained polymeric structure of claim 1 wherein the monomers, polymers and copolymers are selected from the group consisting of polystyrenes, polyethylene, polypropylene, polyacrylates, polymethacrylates, polyamides, polyesters, polyvinyl chloride, styrene-butadiene rubbers (SBR), styrene-ethylene-butadiene-styrene copolymers (SEBS), butyl rubbers, ethylene-propylene rubbers (EPR), ethylene-propylene-diene monomer rubbers (EPDM), ethylene-vinyl acetate copolymers (EVA), ethylene-acrylate, butadiene-acrylonitrile, maleic anhydride modified polymers, maleic anhydride modified copolymers, grafted copolymers and combinations thereof.

3. The absorbent-entrained polymeric structure of claim 1 wherein said polymeric structure comprises from about 25 wt % to about 75 wt % thermoplastic material and from about 25 wt % to about 75 wt % absorbent.

4. An absorbent-entrained polymeric structure defining an outer layer and an interior region, said structure comprising at least one thermoplastic material and at least one absorbent, wherein said absorbent is entirely entrained within said thermoplastic material, wherein said structure does not include a fiber or a hydrophilic compounds, and wherein said polymeric structure comprises from about 25 wt % to about 75 wt % thermoplastic material and from about 25 wt % to about 75 wt % absorbent.

5. The absorbent-entrained polymeric structure of claim 4 wherein said thermoplastic material is selected from the group consisting of a copolymer of at least two monomers, a mixture of at least two polymers from single monomers, a mixture of at least two copolymers, a mixture of at least one polymer from a single monomer and at least one copolymer, and a combination thereof.

6. The absorbent-entrained polymeric structure of claim 4 wherein the monomers, polymers and copolymers are selected from the group consisting of polystyrenes, polyethylene, polypropylene, polyacrylates, polymethacrylates, polyamides, polyesters, polyvinyl chloride, styrene-butadiene rubbers (SBR), styrene-ethylene-butadiene-styrene copolymers (SEBS), butyl rubbers, ethylene-propylene rubbers (EPR), ethylene-propylene-diene monomer rubbers (EPDM), ethylene-vinyl acetate copolymers (EVA), ethylene-acrylate, butadiene-acrylonitrile, maleic anhydride modified polymers, maleic anhydride modified copolymers, grafted copolymers and combinations thereof.

7. An absorbent-entrained polymeric structure defining an outer layer and an interior region, said structure comprising a thermoplastic material and at least one absorbent, wherein the absorbent is entirely entrained within the thermoplastic material and wherein the absorbent forms a concentration gradient, wherein the absorbent is more highly concentrated in the outer layer of the polymeric structure than in the interior region thereof.

8. The absorbent-entrained polymeric structure of claim 7 wherein said polymeric structure comprises from about 25 wt % to about 75 wt % thermoplastic material and from about 25 wt % to about 75 wt % absorbent.

9. The absorbent-entrained polymeric structure of claim 7 wherein said thermoplastic material is selected from the group consisting of a copolymer of at least two monomers, a mixture of at least two polymers from single monomers, a mixture of at least two copolymers, a mixture of at least one polymer from a single monomer and at least one copolymer, and combinations thereof.

10. The absorbent-entrained polymeric structure of claim 7 wherein the monomers, polymers and copolymers are selected from the group consisting of polystyrenes, polyethylene, polypropylene, polyacrylates, polymethacrylates, polyamides, polyesters, polyvinyl chloride, styrene-butadiene rubbers (SBR), styrene-ethylene-butadiene-styrene copolymers (SEBS), butyl rubbers, ethylene-propylene rubbers (EPR), ethylene-propylene-diene monomer rubbers (EPDM), ethylene-vinyl acetate copolymers (EVA), ethylene-acrylate, butadiene-acrylonitrile, maleic anhydride modified polymers, maleic anhydride modified copolymers, grafted copolymers and combinations thereof.

* * * * *